(12) United States Patent
Schelhaas

(10) Patent No.: US 11,479,321 B2
(45) Date of Patent: Oct. 25, 2022

(54) BICYCLE HANDLEBAR SUPPORT

(71) Applicant: Canyon Bicycles GmbH, Koblenz (DE)

(72) Inventor: Clemens Schelhaas, Grevenbroich (DE)

(73) Assignee: Canyon Bicycles GmbH, Koblenz (DE)

( * ) Notice: Subject to any disclaimer, the term of this patent is extended or adjusted under 35 U.S.C. 154(b) by 0 days.

(21) Appl. No.: 17/052,839

(22) PCT Filed: Apr. 30, 2019

(86) PCT No.: PCT/EP2019/061086
§ 371 (c)(1),
(2) Date: Nov. 4, 2020

(87) PCT Pub. No.: WO2019/228737
PCT Pub. Date: Dec. 5, 2019

(65) Prior Publication Data
US 2021/0237826 A1    Aug. 5, 2021

(30) Foreign Application Priority Data

May 5, 2018    (DE) .................. 20 2018 002 222.5

(51) Int. Cl.
*B62K 21/12*    (2006.01)
*B62K 21/26*    (2006.01)

(52) U.S. Cl.
CPC ............ *B62K 21/125* (2013.01); *B62K 21/26* (2013.01)

(58) Field of Classification Search
CPC .................................................... B62K 21/125
See application file for complete search history.

(56) References Cited

U.S. PATENT DOCUMENTS

| | | |
|---|---|---|
| 5,000,469 A | 3/1991 | Smith |
| 5,145,210 A | 9/1992 | Lennon |
| 5,154,094 A * | 10/1992 | Klieber ............... B62K 21/125 280/261 |
| 5,154,095 A | 10/1992 | Giard, Jr. |
| 5,163,339 A | 11/1992 | Giard, Jr. et al. |
| 5,275,067 A | 1/1994 | Lew |
| 6,092,438 A | 7/2000 | Soto |
| 2002/0020246 A1 | 2/2002 | Campagnolo |
| 2003/0150292 A1 | 8/2003 | Duncan |
| 2005/0132839 A1 | 6/2005 | Chen |

(Continued)

FOREIGN PATENT DOCUMENTS

DE    4022434 C2    1/1997
DE    102013008694 A1    11/2014

(Continued)

OTHER PUBLICATIONS

Translation FR2678231.*

*Primary Examiner* — Vicky A Johnson
(74) *Attorney, Agent, or Firm* — The Webb Law Firm

(57) ABSTRACT

The disclosure relates to a bicycle handlebar support, which is suitable in particular for time trial or triathlon bicycles and has a central holding element which in the fitted state points in the direction of travel. Furthermore, in addition to the holding element two arm supports are provided for the lower arms. According to the disclosure a common grip element is provided in a front region of the holding element for gripping jointly with both hands.

12 Claims, 5 Drawing Sheets

(56) References Cited

U.S. PATENT DOCUMENTS

| | | | |
|---|---|---|---|
| 2006/0230872 A1* | 10/2006 | Huang | B62K 21/125 |
| | | | 74/551.1 |
| 2007/0245849 A1 | 10/2007 | Chen | |
| 2009/0013819 A1 | 1/2009 | Nicol | |
| 2010/0294068 A1* | 11/2010 | Fujii | B62M 25/08 |
| | | | 74/473.13 |
| 2010/0326232 A1 | 12/2010 | Wang | |
| 2011/0011197 A1* | 1/2011 | Oku | B62M 25/04 |
| | | | 74/473.12 |
| 2013/0220062 A1* | 8/2013 | Valle | B62M 25/08 |
| | | | 74/523 |
| 2013/0220066 A1 | 8/2013 | Huang | |

FOREIGN PATENT DOCUMENTS

| | | | | |
|---|---|---|---|---|
| FR | 2678231 A1 * | 12/1992 | | B62K 21/125 |
| FR | 2678231 A1 | 12/1992 | | |
| GB | 2283948 A | 5/1995 | | |
| JP | H1086879 A | 4/1998 | | |
| WO | 9300250 A1 | 1/1993 | | |

\* cited by examiner

BICYCLE HANDLEBAR SUPPORT

CROSS-REFERENCE TO RELATED APPLICATIONS

This application is the United States national phase of International Application No. PCT/EP2019/061086 filed Apr. 30, 2019, and claims priority to German Patent Application No. 20 2018 002 222.5 filed May 5, 2018, the disclosures of which are hereby incorporated by reference in their entirety.

BACKGROUND OF THE INVENTION

Field of the Invention

The disclosure relates to a bicycle handlebar support which is particularly suitable for time trial bicycles or triathlon bicycles.

Description of Related Art

For the discipline time trial, the handlebar of a racing bicycle is additionally provided with a so-called support (extension) or control and operating element for a time trial bicycle for use in a time trial position, which support allows for a forward position of the arms with respect to the handlebar, as well as for supporting the upper part of the body by the elbows.

The purpose of a support is to achieve lesser aerodynamic drag and relief of the arms and the upper part of the body, when compared to a position of a cyclist using a normal handlebar. Conventionally, the support consists of a clamping element which in particular serves for fastening to a bicycle handlebar, two forward directed tube elements, the grips connected with the ends of the tube elements directed forward in the traveling direction and the arm rests. Usually, shifter elements for actuating the derailleur are fastened at the front end of the tube elements near the hand. The clamping by means of the clamping elements serves for fastening the support to the steering, either directly to the handlebar or to the handlebar stem. However, variants are also possible in which the handlebar and the support, or the handlebar stem and the support, or the handlebar with the handlebar stem and the support are implemented as one piece. Starting from the clamping elements, the two typically round tube elements of the support are directed forward approximately parallel to each other and merge with the grips which are a continuation of the tubes and are often wrapped with handlebar tape. Likewise, grip elements may e.g. also be slipped onto the ends of the tube elements.

For an improvement of ergonomics, the tube elements are bent upward and/or also inward in the region of the grips. For achieving a lesser aerodynamic drag, the distance between the grips and thus the distance between the tubes is maintained as small as possible. The known solutions with two grips and the hands surrounding the grip elements result in a large front face with high aerodynamic drag. The possible position of a hand on a round tube element or a round grip element only insufficiently corresponds to a natural and ergonomically favorable position of the hand. The arm rests are fastened by means of clamping elements and are spaced apart slightly more than the tubes. The cyclist places his forearms on the cushioned arm rests near the elbows. The distance between the arm rests should be as small as possible to achieve a low aerodynamic drag. For an aerodynamic drag as low as possible, the positions of the grip elements and the arm rests must result in a position of the forearms as parallel as possible to each other. In the known solutions, the arrangement of the grip elements and the arm rests which is the aerodynamically most favorable for this structure results in a very uncomfortable position that has to be trained and requires a measurable holding effort. The muscular system of the torso and the upper arms fatigues strongly, which has adverse effects on the traveling speed as the traveled distance increases. In practice, this results in frequent changes of the hold in an effort to relieve the body. This results in an increase of aerodynamic drag. Further, the operating elements are often not within reach which results in a repositioning of the hands and to delays by an increased aerodynamic drag.

In triathlon, the discipline cycling is followed by running and there, as well, the previous holding effort has an adverse effect on the fatiguing of the athlete and, as a consequence, on the running speed.

In known solutions the arrangement of the operating elements for the switching elements results from the possible attachment position on the end of the tube elements or the grip elements which is the front end seen in the traveling direction. The attachment position of electronic switches for electronic derailleurs results from the possibilities offered by the tube and not from ergonomic aspects, so that the position of the hand has to be changed for shifting gears. Auxiliary instruments such as e.g. bicycle computers can be operated only when taking the hands from the grips, whereby the aerodynamic drag increases and the athlete's attention is distracted.

It is an object of the disclosure to provide a bicycle handlebar support with which it is possible to achieve a position of the cyclist that is as aerodynamically favorable as possible, while at the same time providing an improvement of ergonomics.

The object is achieved with a bicycle handlebar support which is suited in particular for time trial bicycles or triathlon bicycles.

SUMMARY OF THE INVENTION

The bicycle handlebar support of the present disclosure comprises a central holding element or a central part. The same is preferably connected directly with the handlebar and/or the handlebar stem and/or the head tube, using a clamping and/or fixing element. As such, in the mounted state, the holding element is directed in the traveling direction or the longitudinal direction of the bicycle frame. Further, the bicycle handlebar support comprises two arm rests serving for resting the forearms of the user in the region of or near the elbows. The two arm rests are each arranged laterally beside the holding element. Here, the arm rests may be connected separately with the handlebar by means of a clamping element or the like. It is preferred that the arm rests are connected with the holding element and, in particular, are formed integrally with the same. According to the disclosure, a common grip element is arranged in a front region of the holding element, e.g. in the front region of the holding element directed in the traveling direction. According to the disclosure the common grip element is gripped by both hands at the same time. The bicycle handlebar support of the present disclosure thus does not comprise two tube elements with separate grip elements provided at the ends of the tube elements, but a single central holding element or central part, with a common grip element for both hands being provided at the front end thereof directed in the traveling direction.

In a further, particularly preferred embodiment of the bicycle handlebar support of the present disclosure, the common grip element is formed to be asymmetric in particular with respect to a longitudinal direction. Thus, the grip element is preferably formed to be asymmetric with respect to the traveling direction. Thereby, it is possible in particular to place both hands on the grip element. In a preferred embodiment this is effected such that one hand grips the grip element directly, at least in part, and the other hand grips or grasps the first hand at least in part. This, the hands overlap in part in the gripping position, wherein in particular the fingers of both hands overlap each other.

Preferably, the grip element has two thumb support regions. These are preferably arranged at the top of the grip element and opposite each other. When using the bicycle handlebar support, the two thumbs are arranged in a left or a right side of the holding element with respect to a center line or the traveling direction.

In a preferred development of the disclosure switching elements are provided between or below the two thumb support regions. This is advantageous in that the same are easily accessible. If so desired, further switching elements may be provided at a front end of the grip element, e.g. at a front end of the grip element seen in the traveling direction. These are also easily operable by the thumbs or the index fingers.

The individual switching elements may be mechanic switching elements, with electronic switching elements or electric switches being preferred. These may be used to actuate the rear wheel hub gear, a derailleur at the chain rings or other components. Electronic switching elements may in particular be press switches, rocker switches or rotary switches. Here, the communication between the individual components may be wired or wireless. In case of a wireless data transmission, transmitters and/or receivers are provided in particular in the holding element.

In a further preferred embodiment of the bicycle handlebar support auxiliary hand supports are provided together with the holding element. The auxiliary hand supports are arranged in particular in a front region of the holding element, e.g. in a region below the common grip element. These auxiliary hand supports serve for resting the lower side of the hands thereon, so that an additional support is possible. The auxiliary hand supports are preferably formed integrally with the holding element.

In a further preferred embodiment of the bicycle handlebar support auxiliary arm supports are provided together with the holding element. The auxiliary arm supports are arranged in particular in a central region of the holding element, e.g. in a region between the arm rests and the common grip element. These auxiliary arm supports serve for resting a central region of the forearm thereon, so that an additional support is possible. The auxiliary arm supports are preferably formed integrally with the holding element.

Further, it is possible to provide a central region of the holding element with a connection element such as a socket and/or a holding element for auxiliary instruments such as a bicycle computer, a mobile phone or the like.

Similarly, the holding element may comprise a cavity in which a liquid may be provided directly. It would likewise be possible to arrange a drinking container or a drinking bladder in the cavity. Preferably, e.g. a drinking straw is connected with the cavity.

If the holding element is of a hollow design, this may be used on the one hand for receiving liquids, but also as a storage space, e.g. for receiving food, electronic components such as lighting, measuring devices or control devices or also for receiving tools and spare parts.

Due to the positioning of the hands on a common grip element, as provided by the disclosure, aerodynamic drag is reduced substantially. This leads to an increase in speed with the same effort. Further, the hands are arranged very far inward with respect to the elbows. This leads to a clearly more relaxed sitting position and thus to a reduction of the required holding force, which in turn leads to a reduction of the holding effort and the energy consumption.

The preferred arrangement of the thumbs which are substantially arranged parallel to each other, also results in a low aerodynamic drag.

The grip element forms a unit together with the hands so that an aerodynamic body is formed. This in turn leads to a reduction of the aerodynamic drag and to an improvement in comfort.

Due to the preferred unsymmetric design of the grip element, a symmetric ergonomic posture of the cyclist may be achieved. As a consequence, the cyclist fatigues less. In an advantageous development the grip element is formed to be asymmetric such that the asymmetry is designed either for a left-handed or a right-handed person. Depending on the design, the left or the right hand can grip the grip element, while the respective other hand then grasps this hand.

BRIEF DESCRIPTION OF THE DRAWINGS

The disclosure will be described in more detail hereunder with reference to a preferred embodiment and to the accompanying drawings.

In the Figures.

DESCRIPTION OF THE INVENTION

Figure 1:
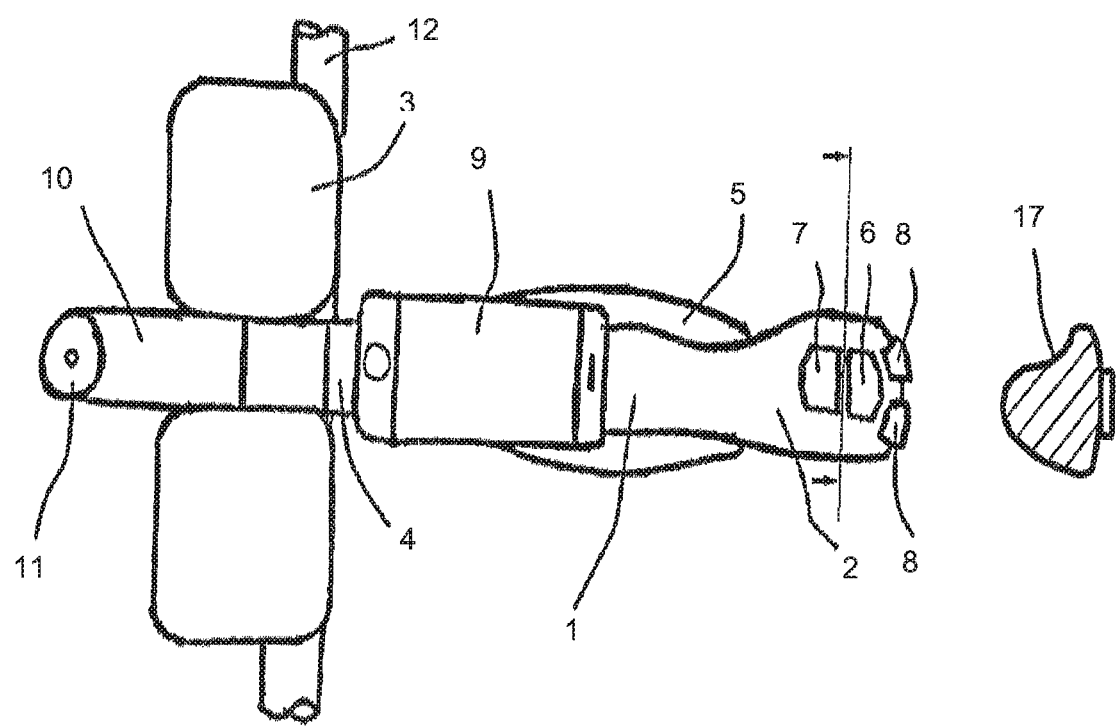
FIG. 1 shows the support in top plan view.

In the variant illustrated in FIG. 1, the support 1 consists of the asymmetric grip element or grip 2 for a right-handed person, the arm support 3 and the holding element or central part 4. The arm support 5 is located below the grip 2. The electronic switch elements or switches 6 for upshifting the gear system and the switches 7 for downshifting are positioned on the grip. The switches 8 are positioned at the front part of the grip 2 and serve for operating the smartphone or the bicycle computer 9. The handlebar stem 10 is fastened to the head tube 11 that receives the handlebar 12. The handlebar stem 10 and the support 1 are connected with each other. The electronic display instrument 9 (smartphone or bicycle computer) is located above the central part 4.

Figure 2:
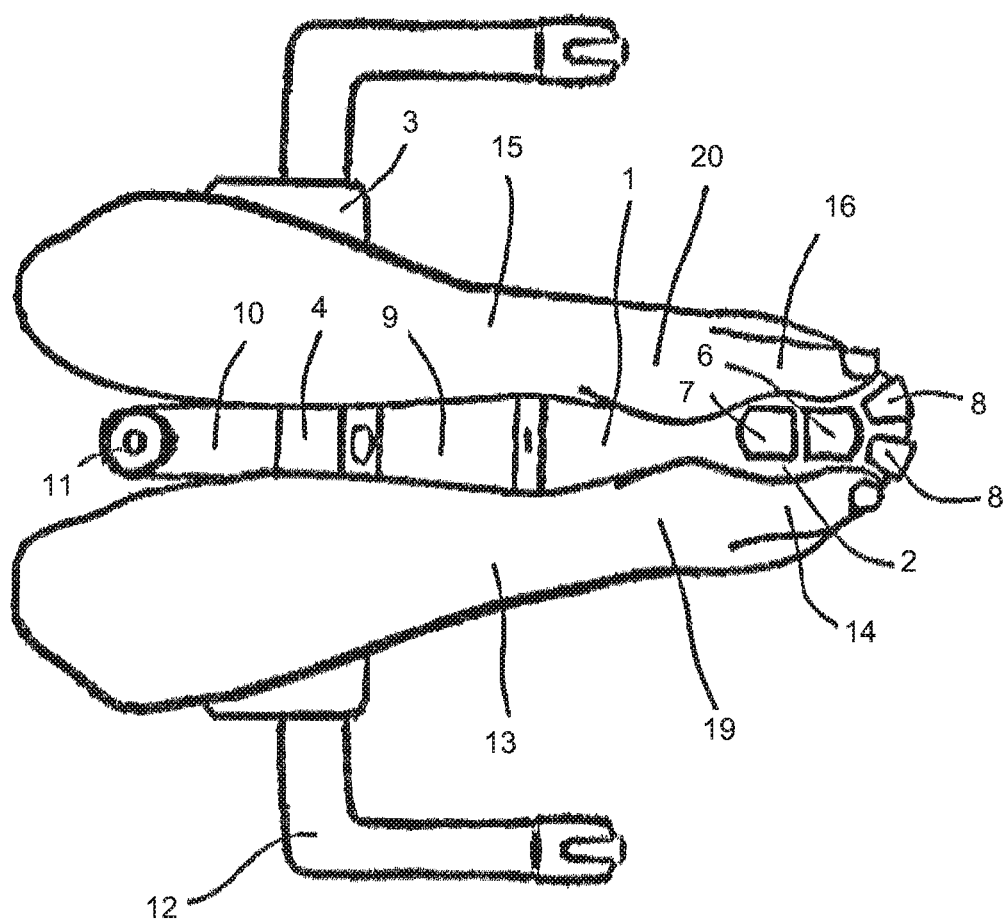
FIG. 2 shows the support with forearms and hands in the riding position and in top plan view.

FIG. 2 illustrates the support 1 with forearms 13, 15 and hands 19, 20 in the riding position and in top plan view. The thumbs 14, 16 rest almost parallel on the grip, directed forward in the traveling direction. The switches 7, 6 can be actuated by a mere change of the position of the thumb 14, 16 without changing the hand position. The switches 8 are actuated by a mere change of the position of the index fingers without a change of the hand position.

Figure 3:
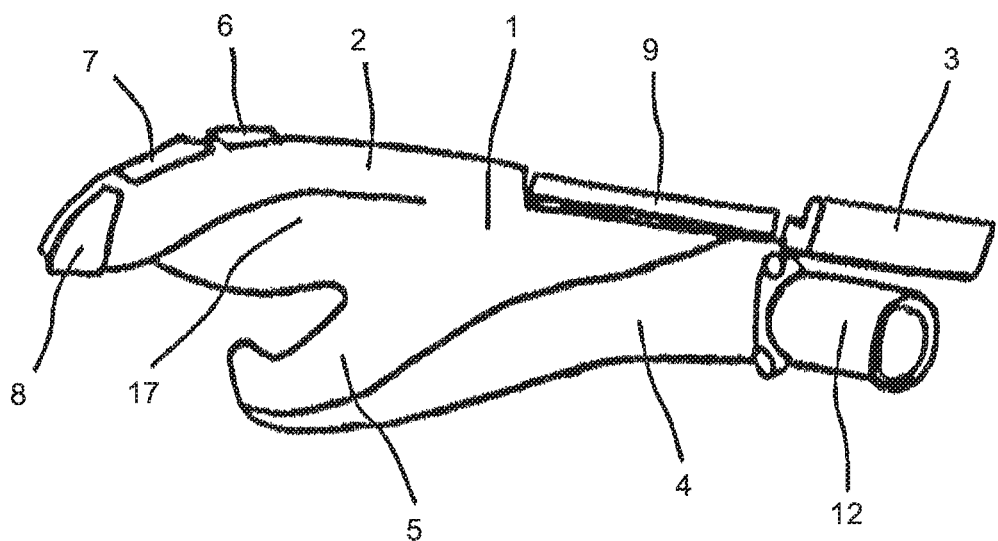
FIG. 3 shows the support in the version for a right-handed person, seen from the left side.

FIG. 3 shows the support 1 for a right-handed person in side view from the left side. In the front part 2, a recess 17 for receiving the fingers of the right hand is located below the switches 6, 7.

Figure 4:
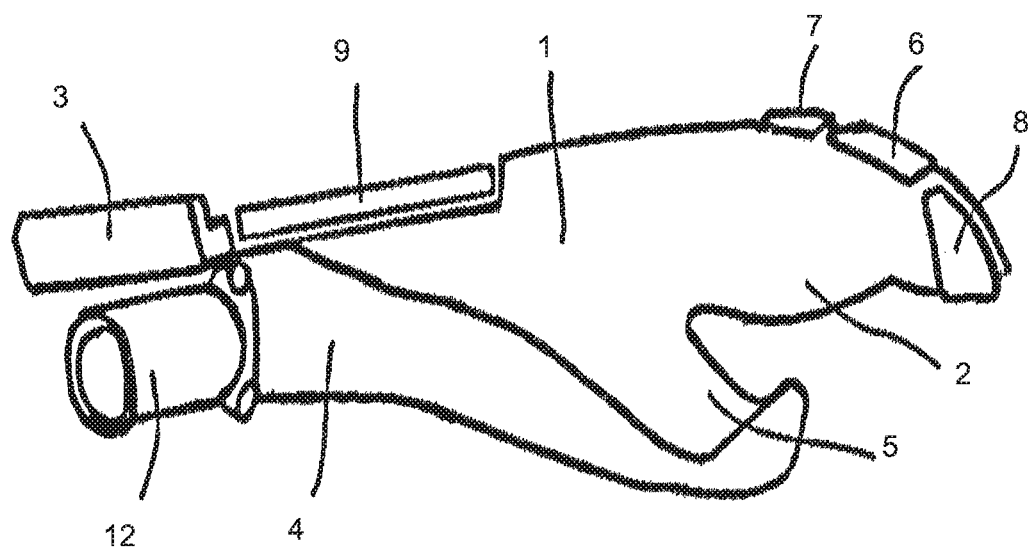
FIG. 4 shows the support in the version for a right-handed person, seen from the right side.

FIG. 4 illustrates the support 1 for a right-handed person in a view from the right side. On the right side, the asymmetric grip 2 has no recess for receiving fingers, but is surrounded by the palm of the right hand 19.

Figure 5:
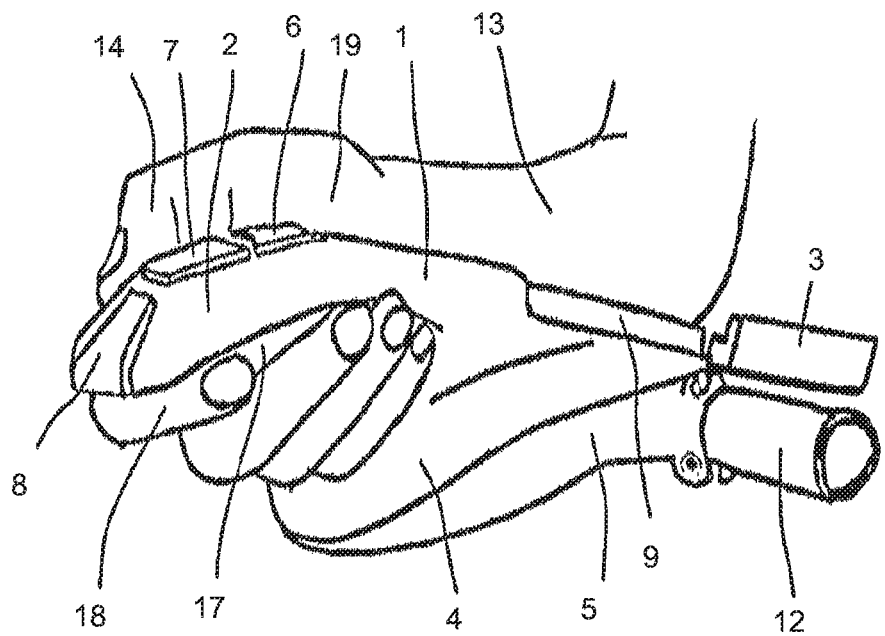
FIG. 5 shows the support in the version for a right-handed person, seen from the left side, with the forearm, hand and fingers in the riding position.

FIG. 5 illustrates the support 1 for a right-handed person in side view from the left side. The right hand surrounds the asymmetric grip 2, the fingers 18 being placed in the recess 17 from below. The forearm 13 rests on the arm supports 3. The thumb 14 rests on the grip 2 and is directed forward in the traveling direction.

Figure 6:
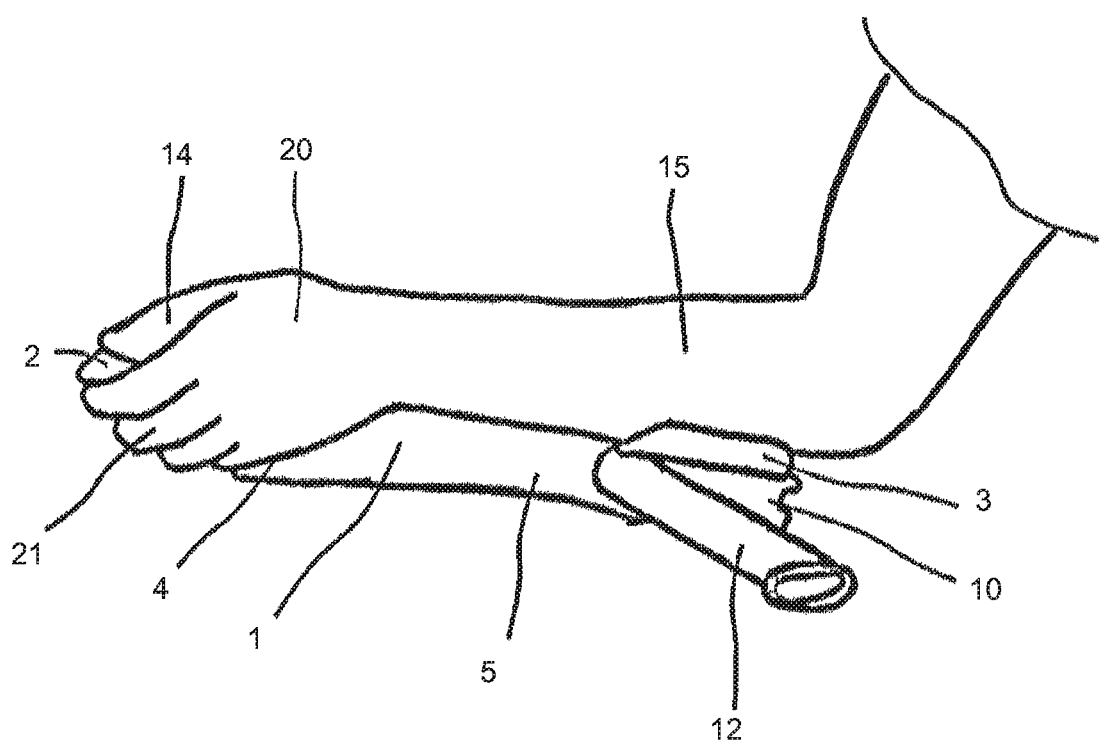
FIG. 6 shows the support in the version for a right-handed person, seen from the left side, with the forearms, hands and fingers in the riding position.

FIG. 6 illustrates the support in the variant for a right-handed person seen from the left side with the forearm 15, hand 20 and fingers 21 of the left hand 20 in the gripping position. The fingers 18 of the right hand 19 lie under the fingers of the left hand 21 and are covered almost completely in this view.

Figure 7:
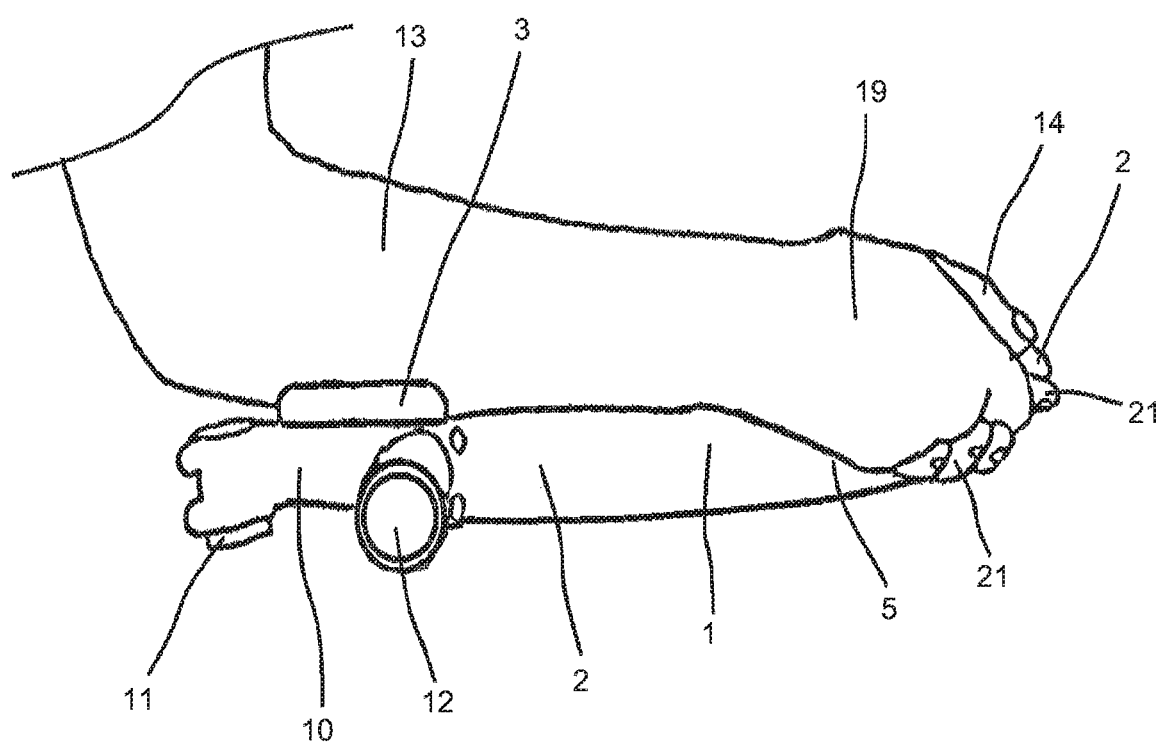
FIG. 7 shows the support in the version for a right-handed person, seen from the right side, with the right forearm, the right hand and fingers of the left hand in the riding position.

FIG. 7 illustrates the support in the variant for a right-handed person seen from the right side with the forearm 13, the right hand 19 and the fingers of the left hand 21 in the gripping position. The fingers 18 of the right hand 19 lie under the fingers of the left hand 21 and are covered almost completely in this view.

The invention claimed is:

1. A bicycle handlebar support comprising,
a central holding element directed in a traveling direction when in a mounted state,
two arm supports, each arranged laterally beside the holding element, and
a single common grip element, said common grip element being arranged at a front portion of the holding element, wherein the common grip element is configured to be gripped by a left hand and a right hand at a concurrent time, wherein the common grip element is adapted so that both hands will overlap at least in part when being gripped, and wherein the common grip element is asymmetric with respect to the longitudinal direction in the traveling direction.

2. The bicycle handlebar support according to claim 1, wherein the arm supports are connected with the holding element.

3. The bicycle handlebar support according to claim 1, wherein the grip element is designed to be asymmetric to a longitudinal direction.

4. The bicycle handlebar support according to claim 1, wherein the grip element is designed such that it can be gripped completely with one hand.

5. The bicycle handlebar support according to claim 1, wherein the grip element has two thumb support regions on its upper side.

6. The bicycle handlebar support according to claim 1, wherein at least one switch element is provided between or below thumb support regions.

7. The bicycle handlebar support according to claim 6, wherein the at least one switch element is at least in part configured as electric or electronic switch elements.

8. The bicycle handlebar support according to claim 1, wherein at least one switch element is provided at a front end of the grip element.

9. The bicycle handlebar support according to claim 1, wherein two auxiliary arm supports are connected with the holding element.

10. The bicycle handlebar support according to claim 1, wherein an auxiliary hand support is connected with the holding element in the front portion of the holding element.

11. The bicycle handlebar support according to claim 1, wherein a receiving element for auxiliary instruments is provided in an upper side of the holding element.

12. The bicycle handlebar support according to claim 1, wherein the holding element comprises a cavity.

\* \* \* \* \*